United States Patent [19]
Romey et al.

[11] Patent Number: 4,517,086
[45] Date of Patent: May 14, 1985

[54] TUBULAR FILTER APPARATUS

[75] Inventors: Ingo Romey, Hünxe; Rüdiger Lennartz, Pulheim, both of Fed. Rep. of Germany

[73] Assignees: Bergwerksverband, Essen; Boll & Kirch Filterbau GmbH, Kerpen, both of Fed. Rep. of Germany

[21] Appl. No.: 481,290

[22] Filed: Apr. 1, 1983

[30] Foreign Application Priority Data

Apr. 2, 1982 [DE] Fed. Rep. of Germany ....... 3212316

[51] Int. Cl.$^3$ ............................................. B01D 25/32
[52] U.S. Cl. ................................. 210/323.2; 210/334; 210/388; 210/416.1
[58] Field of Search ............... 210/769, 771, 791, 322, 210/323.1, 323.2, 330, 334, 331, 332, 345, 383, 384, 388, 416.1

[56] References Cited

U.S. PATENT DOCUMENTS 2,523,793 9/1950 Vance ................................. 210/323.2
4,265,771 5/1981 Lennartz et al. .................. 210/323.2

FOREIGN PATENT DOCUMENTS 667220 6/1979 U.S.S.R. ........................... 210/323.2

Primary Examiner—Richard V. Fisher
Assistant Examiner—Wanda L. Millard
Attorney, Agent, or Firm—Karl F. Ross; Herbert Dubno

[57] ABSTRACT

An apparatus for filtering solids suspended in a slurry has a housing divided by a horizontal partition into a lower filtrand chamber and an upper filtrate compartment, the partition serving as a vibratile suspension for a multiplicity of filter tubes depending therefrom into the filtrand compartment. An impactor disposed above the housing top has a vertical plunger, coupled with the partition, which is surrounded by or forms a discharge duct with a lower end closely overlying the bottom of a depression formed in the partition; this duct has an outlet opening above the housing top through which effluent present in the filtrate compartment is expelled by the pressure of incoming slurry in a working phase and by the pressure of a scavenger gas such as air in a purging phase.

10 Claims, 3 Drawing Figures

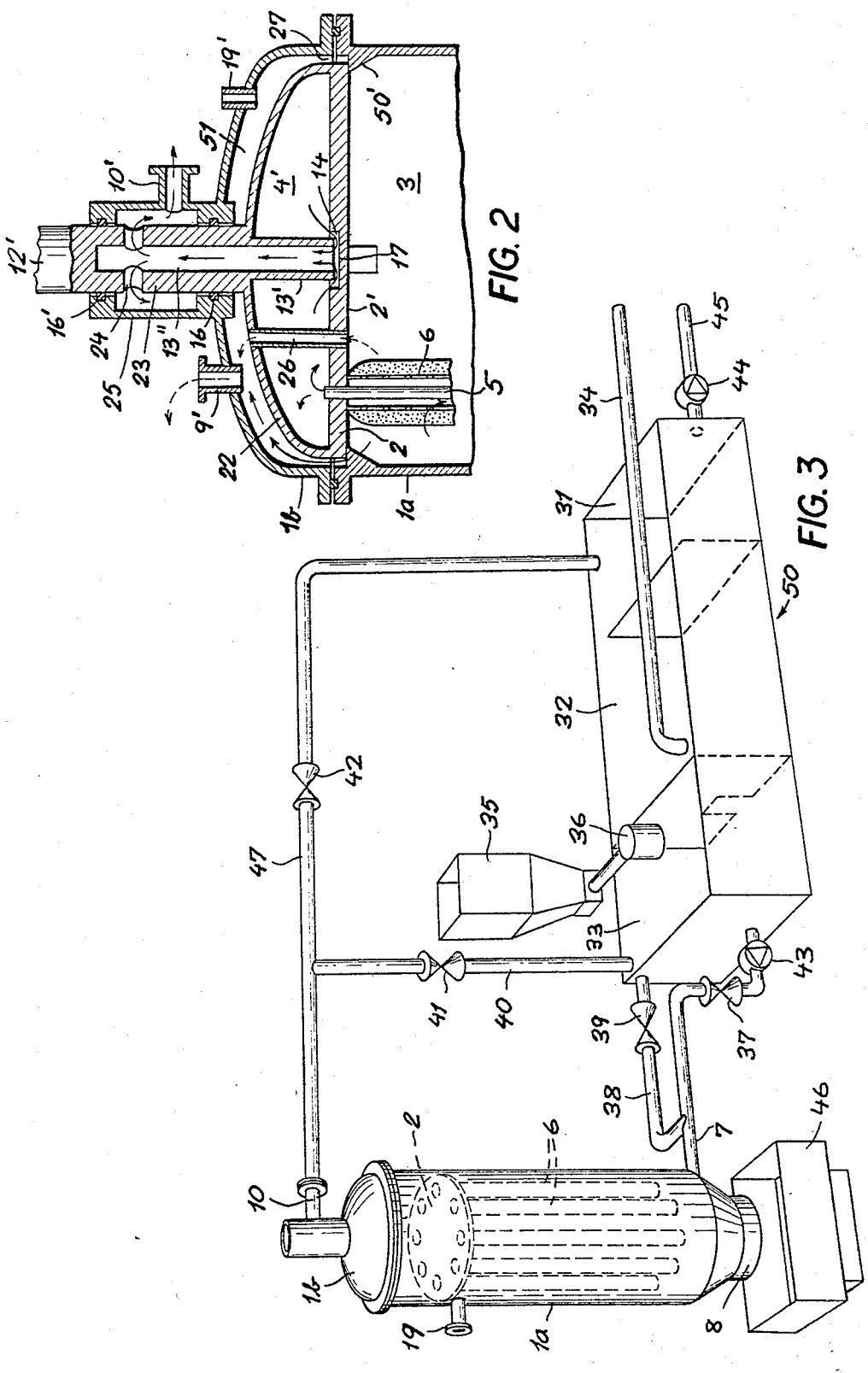

TUBULAR FILTER APPARATUS

FIELD OF THE INVENTION

Our present invention relates to a filtration apparatus of the type wherein a housing, usually of cylindrical shape centered on a vertical axis, is internally divided by a horizontal partition into a lower filtrand chamber and an upper filtrate compartment, the partition being limitedly vertically displaceable by an impactor and serving as a support for a plurality of tubular filter elements that are suspended therefrom into the filtrand chamber. A first inlet port of the housing serves for the admission of a suspension of solid particles in a liquid, referred to hereinafter as a slurry, into the filtrand chamber during a working phase whereas a second inlet port enables the introduction of a scavenger gas under pressure, usually air, into the same chamber during a purging phase. Filtered liquid, entering the filtrate compartment under pressure of the pumped-in slurry or of the scavenger gas, is expelled as an effluent at an outlet port communicating with that compartment. The housing is further provided at its bottom with gate means for the removal of filter cake dislodged from the filter elements when the latter, together with the supporting partition, are shaken by the impactor in a regeneration phase following the purging phase.

BACKGROUND OF THE INVENTION

An apparatus of this description has been disclosed in our commonly owned U.S. Pat. No. 4,265,771. According to that disclosure, the outlet port is disposed at the periphery of the housing just above the partition in order to drain as much liquid as possible from the filtrate compartment in the purging phase. As long as the liquid in the filtrate compartment fully covers the outlet port, the scavenger gas will accumulate at the top of that compartment and thus exert pressure upon the liquid to drive it out. As soon as the outlet port is unblocked, however, that pressure will greatly diminish whereby some of that liquid will still form a shallow pool above the partition and will flow back into the filter tubes (termed "candles" in our prior patent) when the flow of scavenger gas has terminated. In order to prevent an accumulation of the returning liquid in the tubes and a resulting rewetting of the externally adhering filter cake after the latter has been dried by the gas flow, our prior patent teaches the provision of receptacles for that liquid—termed "return housings"—at the lower ends of the tubes.

Another solution for the problem of backflow is proposed in U.S. Pat. No. 4,289,630 according to which the outlet port is formed by a discharge duct whose entrance lies at the bottom of the compartment and descends from the partition through the filtrand chamber to the peripheral housing wall. In an apparent attempt to minimize the amount of liquid that can accumulate in the filtrate compartment, the latter is made very shallow and is confined by a closed casing of small height which is bodily vibrated by the associated impactor. This vibration, of course, is communicated to the discharge duct which therefore must be specially designed to avoid any contamination of the effluent by the unfiltered slurry.

OBJECTS OF THE INVENTION

The general object of our present invention is to minimize the backflow of filtrate in an apparatus of the type referred to.

A related object is to provide means for simplifying the problem of effectively sealing the filtrate compartment against the filtrand chamber.

SUMMARY OF THE INVENTION

In accordance with our present invention, a filtration apparatus of the type described above has a discharge duct which rises in the filtrate compartment toward an outlet port preferably disposed above the housing top, the open lower end of this duct closely overlying the partition which forms the bottom of that compartment while leaving a narrow gap therebetween for the passage of liquid to the outlet port. As long as there is any liquid left in the filtrate compartment, it will seal the gap and thus keep up the gas pressure within the compartment in the purging phase. As the discharge duct does not traverse the filtrand chamber, no particular precautions are required to prevent a mixing of slurry with the effluent.

Advantageously, pursuant to a more particular feature of our invention, the entrance end of the discharge duct is located beneath the upper surface of the partition by forming the latter with a depression spacedly surrounding the lower end of the duct. This provides an even more effective liquid seal as the scavenger gas will not be able to reach the outlet port until virtually all the effluent has been driven well up into the duct.

Our improved filtration apparatus may otherwise be similar to that described and illustrated in our prior patent, except that the backflow-collecting receptacles at the lower ends of the filter tubes can be omitted. We may, however, depart from the earlier structure by confining the filtrate compartment between the partition and an upper wall forming therewith a closed casing which separates that compartment from the interior of the overall housing. With the more effective draining of the compartment facilitated by the rising discharge duct, the casing need not be made nearly as shallow as in the apparatus of prior U.S. Pat. No. 4,289,630 and may therefore store a considerably larger volume of effluent for a given housing diameter. This enables the casing to be rigidified through the use of an upwardly convex upper wall which, advantageously, is linked with the partition by several preferably tubular stays for further solidification.

In either case, the impactor designed to shake the partition in the regeneration phase can have a vertically reciprocable plunger coaxial with the discharge duct to form a compact assembly penetrating the housing top at only one point. When the filtrate compartment is bounded by that housing top, as in our prior patent, the duct may form a tube coaxially surrounding the plunger. When, on the other hand, the filtrate compartment is confined in a bodily reciprocable casing, with the plunger terminating at its upper wall, the duct can be formed in part by a lower extremity of the plunger and in part by a downward extension of that extremity traversing the casing.

According to our prior patent, the inlet for the scavenger gas is disposed at a small distance below the partition. We have since found, however, that the direct introduction of high-pressure gas into the filtrand chamber may cause part of the filter cakes to be prematurely dislodged by the gas stream, together with part of a deposit of filter aid such as kieselguhr initially accumulated on the peripheral tube surfaces as known in the art and as discussed below; this, in turn, would let some solids pass through the tube perforations into the filtrate compartment. In order to prevent such an occurrence, a further feature of our invention provides for a positioning of the second inlet port of the housing at a level not lower than that of the partition. Thus, the entering gas stream will reach the filtrand chamber only after downward deflection at the partition edge or, in the embodiment with a vertically reciprocable effluent casing, by the upper wall of that casing before reaching the filtrand chamber.

BRIEF DESCRIPTION OF THE DRAWING

The above and other features of our invention will now be described in detail with reference to the accompanying drawing in which:

FIG. 2 is a similar view of the upper part of a modified apparatus embodying the invention; and FIG. 3 is a somewhat diagrammatic perspective view of a plant including the apparatus of FIG. 1.

SPECIFIC DESCRIPTION

Figure 1:
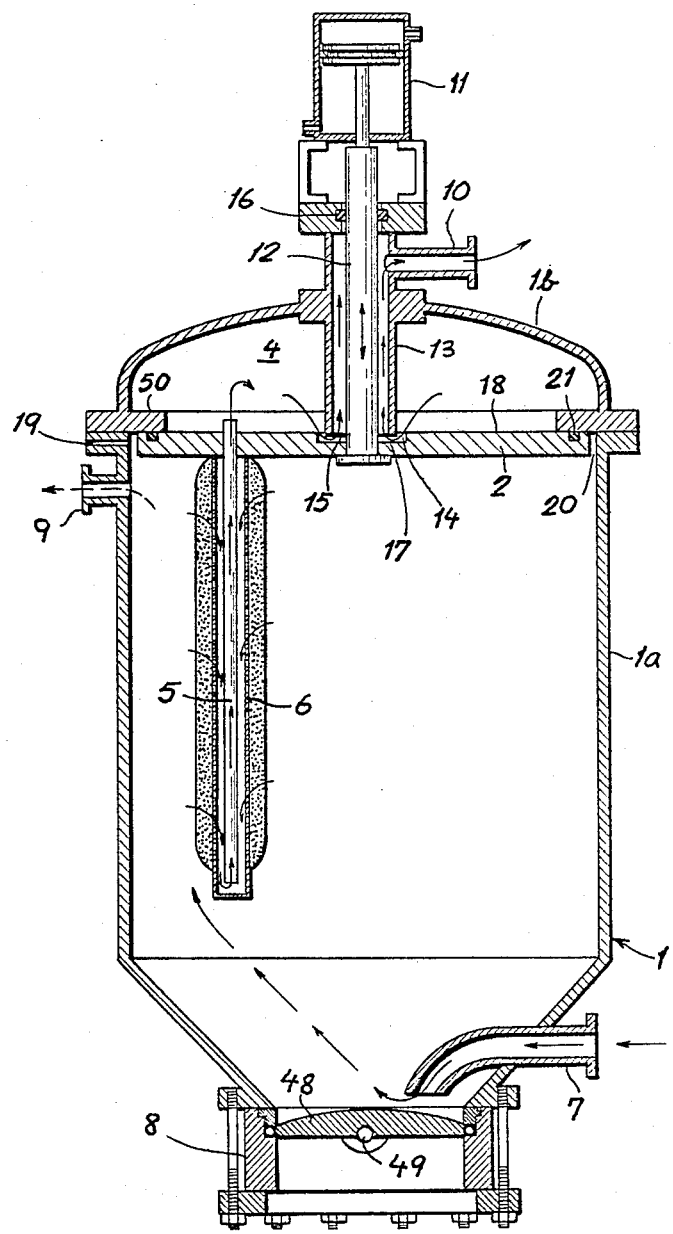
FIG. 1 is a sectional elevational view of a filtration apparatus according to our invention.

The apparatus shown in FIG. 1 comprises a housing 1 with a generally cylindrical body 1a and a cover 1b removably secured to that body in a fluidtight manner by nonillustrated fasteners. Housing body 1a surrounds a filtrand chamber 3 separated by a flat plate 2, forming a horizontal partition, from a filtrate compartment 4 which is bounded at the top by cover 1b. A multiplicity of tubular filter elements (only one shown) are suspended from partition 2 in a cylindrical array—see FIG. 3—centered on the housing axis; each of these elements comprises an inner riser tube 5 spacedly surrounded by an outer sieve tube 6 with a closed bottom and a perforated peripheral wall. Inner tube 5, whose open lower end is slightly separated from the bottom of outer tube 6, rises through partition 2 so as to project above its upper surface into compartment 4.

Housing body 1a has a lower inlet port 7 for the admission of slurry, an upper inlet port 19 for the introduction of scavenger gas such as compressed air, and an ancillary outlet port 9 in the vicinity of partition 2 enabling partial recirculation of slurry as indicated by arrows. Inlet port 7 is formed by a downwardly curved piece of pipe which opens into chamber 3 somewhat above a bottom aperture 8 provided with a gate 48 which is swingable about a fulcrum 49 for the discharge of fragmented filter cake as described in our prior U.S. Pat. No. 4,265,771. The downward curvature of pipe 7 is designed to prevent its blockage by sedimentation; such sedimentation is also inhibited by the constant circulation of slurry within chamber 3 through ports 7 and 9. Port 19, on the other hand, is located at the upper end of housing body 1a so as to confront a peripheral edge of partition 2 from which it is separated by an annular space 20; if desired, however, this space could be limited to the immediate vicinity of port 19.

In accordance with an important feature of our present invention, the upper surface 18 of partition 2 is formed with a central depression 17 surrounding with clearance the open lower end 15 of a vertical discharge duct 13 so as to define therewith an annular gap 14. Duct 13, which is integral with housing cover 1b, penetrates that cover and is provided near its upper end with an outlet port 10 for the discharge of effluent reaching the filtrate compartment 4 through the riser tubes 5 of the several filter elements suspended from partition 2. A vertically reciprocable plunger 12 positively coupled with partition 2 passes coaxially and with all-around clearance through duct 13 as part of an impactor 11 which is fixedly mounted at the top of the duct. A sealing ring 16 of small diameter is all that is needed to separate the interior of duct 13 from the atmosphere. In the normal position of impactor 11, partition 2 is held by plunger 12 with its upper surface 18 against an overhanging inner peripheral flange 50 of cover 1b which it contacts through the intermediary of an elastic annular seal 21.

FIG. 2 shows a modified apparatus according to our invention wherein the filtrand chamber 3 is separated from a filtrate compartment 4' by a partition 2' which again supports an array of filter elements 5, 6 and constitutes the bottom of a closed casing partly formed by a bell-shaped upper wall 22. Several tubular stays 26 (only one shown) pass vertically through compartment 4' to brace the convex wall 22 against the flat, rigid partition 2' while also forming channels through which slurry or gas may flow between chamber 3 and a clearance 51 separating the housing top 1b from casing wall 22. A lower extremity 23 of a plunger 12', reciprocable by an impactor not further illustrated, is rigid with casing wall 22 and has a lower extension 13' forming part of a discharge duct again separated by a narrow annular gap 14 from the rim of a central recess or depression 17 in the upper surface of partition 2'. A part 13" of the discharge duct is constituted by an axial bore of plunger extremity 23 having lateral apertures 24 through which effluent may pass to an outlet port 10'. This outlet port is integral with a stationary sleeve 25 that in turn forms an upward extension of housing cover 1b and spacedly surrounds the plunger extremity 23 which it engages via a pair of sealing rings 16, 16'; the interior of sleeve 25 connects the apertures 24 with the port 10'. If a fixed positioning of the outlet port is not essential, such a port could also be formed directly on plunger extremity 23 with omission of sleeve 25. The lower seal 16, of course, would have to remain in place as in the embodiment of FIG. 1; the large sealing ring 21 of FIG. 2 is not needed in this embodiment.

The impactor, supported on cover 1b through the intermediary of sleeve 25, normally lowers its plunger 12' into the illustrated position in which partition 2' rests on several inner abutments 50' of housing body 1a. These abutments do not significantly impede communication between filtrand chamber 3 and clearance 51 so that a circulating part of the slurry introduced into chamber 3 at the bottom of the housing can reach an ancillary port 9' in cover 1b through a peripheral space 27 and stays 26 as respectively indicated by full-line and broken-line arrows. An inlet port 19' for scavenger gas is here also disposed on cover 1b.

In FIG. 3 we have shown the apparatus of FIG. 1 mounted above a receptacle 46 for filter cake to be removed from housing 1 in a regeneration phase in which its impactor (omitted in this Figure) is operated. The slurry to be fed in a working phase with inlet port 7 comes from a container 30 divided into three sections 31, 32 and 33. Section 32 constitutes a slurry reservoir and communicates with section 33 serving as a mixing vessel. A pump 43 delivers the contents of that vessel to conduit 7 by way of a shut-off valve 37. A branch 38 of this conduit leads back to vessel 33 via another shut-off valve 39. Effluent from discharge port 10 can pass via a conduit 47 into container section 31 by way of a shut-off valve 42 while another such valve 41 in a branch 40 of that conduit enables its return to mixing vessel 33. A hopper 35 allows the introduction of kieselguhr into that chamber through a gate 36. Fresh slurry is fed in by way of a conduit 34 while effluent can be withdrawn through a pump 44 via a conduit 45. A throttled further conduit, not shown, may extend from outlet 19 (FIG. 1) to vessel 33.

In an initial phase of an operating period, valves 37 and 41 are open whereas valves 39 and 42 are closed. With kieselguhr added to the slurry in mixing vessel 33, pump 43 drives the mixture into the filtrand chamber 3 (FIG. 1) where part of it passes through the perforations of sieve tubes 6 and enters the filtrate compartment 4 via riser tubes 5. This as yet unfiltered slurry is being recirculated through conduit 40 until sufficient kieselguhr has been deposited on the outer surfaces of tubes 6 to provide a clean effluent. Thereafter, in a working phase, valves 39 and 41 are closed while valve 42 is opened so that the effluent can pass into container section 31 from which it can be drained by pump 44 and conduit 45. When the thickness of the filter cake accumulating on tubes 6 becomes excessive, e.g. as determined by a back-pressure meter connected to port 7, pump 30 is stopped and a purging phase is initiated with closure of valves 37 and 42 while valves 39 and 41 are being opened. Scavenger air under pressure is now admitted into filtrate compartment 4 (FIG. 1) by way of port 19. This causes the slurry in chamber 3 to flow back into container section 33 through conduit 38 while the liquid in compartment 4 is expelled via gap 15, duct 13 and port 10 into conduit 40 for remixing with the returning slurry. Virtually all the effluent in compartment 4 will be driven out by the air pressure so that hardly any of it will trickle down within filter elements 5, 6. The filter cake accumulated on the outer surfaces of tubes 6 will be dried by the air flow so as to be readily fragmented and dislodged in the subsequent regeneration phase when the air supply is halted and impactor 11 is actuated to shake the partition 2 together with the filter elements suspended therefrom. With gate 48 opened, the fragmented cake is unloaded from housing 1 whereupon the described procedure can be resumed.

The operation of the apparatus of FIG. 2 is essentially the same, with casing 2', 22 periodically lifted from its illustrated position in the regeneration phase, in contradistinction to the motion of partition 2 in FIG. 1 which is depressed by the impact below its illustrated normal level.

The partial recirculation of slurry via ancillary port 19 or 19' takes place only in the working phase. At all other times this port is closed by a nonillustrated valve.

We claim:

1. A filtration apparatus comprising:
    a housing internally divided by a limitedly vertically displaceable horizontal partition into a lower filtrand chamber and an upper filtrate compartment, said filtrand chamber being provided with means defining a first inlet port for the admission of a slurry to be filtered in a working phase and with means defining a second inlet port for the introduction of a scavenger gas under pressure in a purging phase;
    a plurality of tubular filter elements suspended from said partition into said filtrand chamber, each of said filter elements having a closed bottom and a perforated peripheral wall spacedly surrounding a riser tube projecting above said partition for delivering liquid from said slurry to said filtrate compartment while entrained solids are retained on the outer surface of said peripheral wall to form a filter cake;
    a discharge duct rising in said filtrate compartment with an open lower end closely overlying said partition and reaching to a depression formed in an upper surface of said partition while leaving a narrow gap therebetween at least in an upper position of said partition, said duct being provided at a level above said gap with means defining an outlet port for the discharge of liquid forced from said filtrate compartment through said gap under pressure of entering slurry in said working phase and of said scavenger gas in said purging phase;
    an impactor coupled with said partition for shaking same in regeneration phase following said purging phase to dislodge adhering filter cake from the peripheral walls of said filter elements;
    gate means at the bottom of said filtrand chamber enabling the removal of dislodged filter cake from said housing; and
    means at said second inlet port for deflecting scavenger gas entering said filtrand chamber away from said filter elements.

2. A filtration apparatus as defined in claim 1 wherein said impactor is provided with a vertically reciprocable plunger coaxial with said duct.

3. A filtration apparatus as defined in claim 2 wherein said outlet port is disposed above the top of said housing.

4. A filtration apparatus as defined in claim 3 wherein said duct is a tube penetrating the top of said housing, said plunger extending within said tube to said partition and engaging the latter within said depression.

5. A filtration apparatus as defined in claim 1 wherein said partition is the bottom of a casing with an upper wall bounding said filtrate compartment and separating same from the interior of said housing, said impactor is provided with a plunger penetrating the top of said housing and being secured to said upper wall for bodily reciprocating said casing to said regeneration phase, said duct being constituted in part by a lower extremity of said plunger terminating at said upper wall and in part by a downward extension of said extremity traversing said casing.

6. A filtration apparatus as defined in claim 5 wherein said casing is provided with tubular stays extending between said partition and said upper wall while forming passages for the circulation of slurry from said filtrand chamber to means defining a clearance separating said upper wall from the top of said housing, said upper wall being upwardly convex.

7. A filtration apparatus as defined in claim 5 wherein said outlet port is formed by a sleeve mounted on the top of said housing, said sleeve surrounding said plunger and being spaced therefrom by an annular passage communicating with said duct through a lateral bore in said extremity.

8. A filtration apparatus as defined in claim 6 wherein said second inlet port opens onto said clearance.

9. A filtration apparatus as defined in claim 1 wherein said second inlet port is disposed at a level not lower than that of said partition.

10. A filtration apparatus as defined in claim 1 wherein said first inlet port comprises a pipe section curved down toward said gate means.

* * * * *